Oct. 23, 1962　　　　　　J. C. TUCKEY　　　　　　3,059,687
PIPE EXPANDER AND METHOD OF EXPANDING PIPE
Filed May 9, 1960　　　　　　　　　　　　　　3 Sheets-Sheet 2
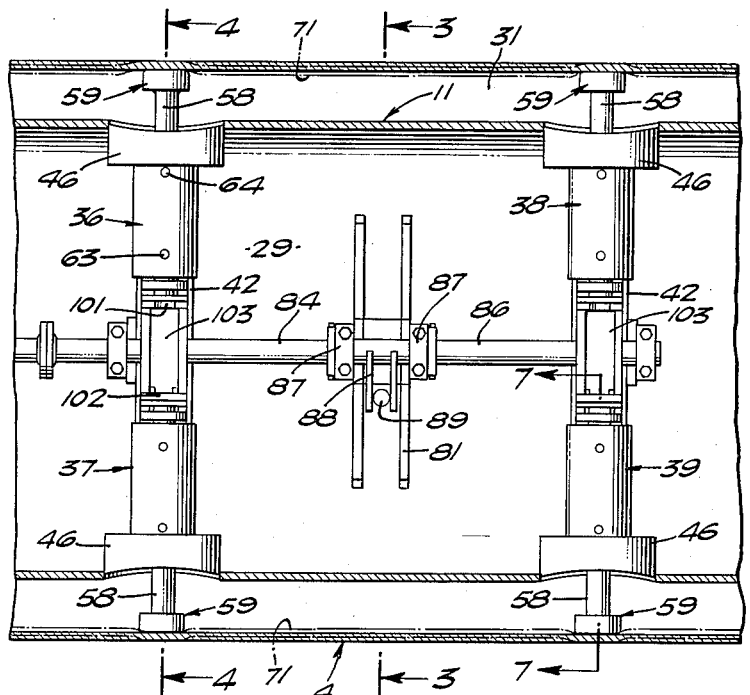
FIG. 2.
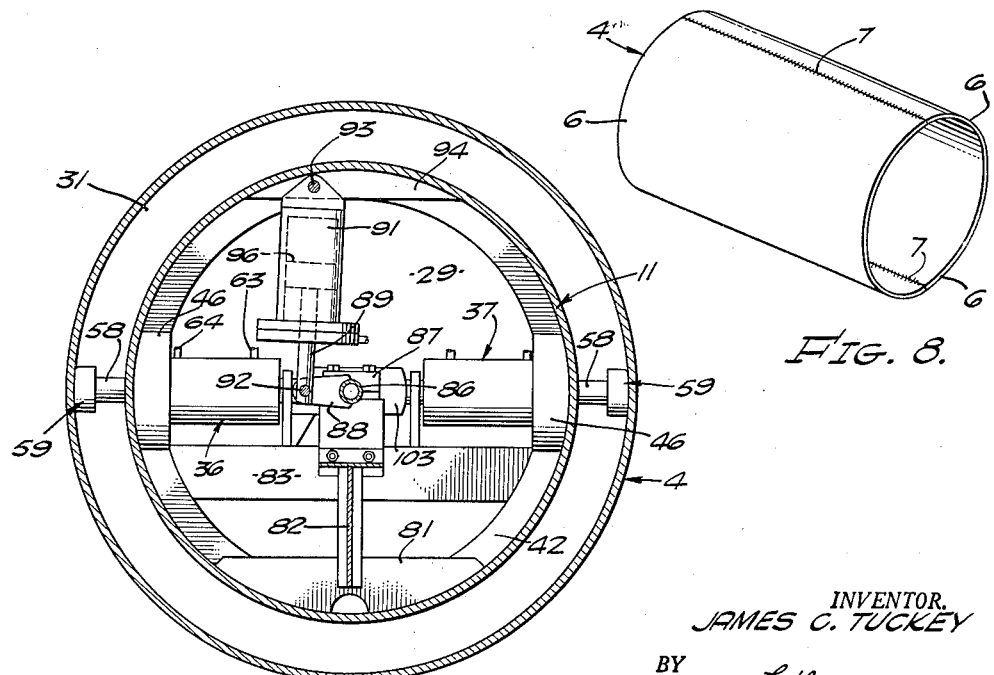
FIG. 3.
FIG. 8.
INVENTOR.
JAMES C. TUCKEY
BY Lothrop & West
ATTORNEYS Oct. 23, 1962 J. C. TUCKEY 3,059,687
PIPE EXPANDER AND METHOD OF EXPANDING PIPE
Filed May 9, 1960 3 Sheets-Sheet 3

INVENTOR.
JAMES C. TUCKEY
BY Lothrop & West
ATTORNEYS

United States Patent Office 3,059,687
Patented Oct. 23, 1962

3,059,687
PIPE EXPANDER AND METHOD OF
EXPANDING PIPE
James C. Tuckey, La Puente, Calif., assignor to Yuba
Consolidated Industries, Inc., a corporation
Filed May 9, 1960, Ser. No. 27,920
7 Claims. (Cl. 153—79)

My invention relates to machines of the general sort shown in the application of Samuel G. Marinovich, et al., Serial No. 631,779, filed December 31, 1956, now Patent Number 3,021,888, and entitled Method of Testing and Truing Pipe Diameters and assigned to the assignee of the present application. Machines of the sort mentioned are especially useful in connection with the manufacture of a pipe fabricated of plates bent into arcuate form, the plates being longitudinally welded together to result in an approximately right circular cylindrical form. The usual pipes fabricated in this fashion are of the order of four to six or more feet in diameter. The manufacture of pipe according to this method is generally of fair accuracy, but it is found that the pipes do not always come out exactly circular in cross section.

According to the mentioned application, such pipes after fabrication are suitably mounted and sealed at the ends, and are subjected to an interior hydraulic pressure which has the effect of rendering the pipe cross section more nearly circular, or at least circular within the commerical tolerance.

It is found in practice that sometimes another distortion occurs in that the pipe is somewhat bowed or arched; that is, not perfectly true about a longitudinal axis. This deviation occurs primarily in pipe made up of two longitudinally extending plates and customarily is a bow or curvature with the offset from the axis being in a single direction referred to as "horizontal" for convenience. Similar difficulties arise in the formation of pipe in other ways than fabrication as described, and the instant process and apparatus are also useful therewith.

It is therefore an object of this invention to provide a device and method of treating pipe fabricated as described, or otherwise made, in order to produce a product more nearly conforming to the geometrical ideal, and to produce a pipe which is well within the commercial tolerances.

Another object of the invention is to provide a machine for subjecting a pipe to an internal hydraulic pressure for truing purposes, and for carrying on at substantially the same time an operation for straightening the pipe.

Another object of the invention is to provide a means for establishing the amount of straightening that is to be accomplished in a straightening operation.

Another object of the invention is to provide a process effective upon a pipe after fabrication and, by appropriate treatment, to shape the pipe very closely to the desired geometrical configuration.

Another object of the invention is to provide a hydraulically operated machine for finally forming and straightening pipe, yet one which is not entirely dependent for its operation upon hydraulic mechanism.

A still further object of the invention is to provide an improved machine and process for producing fabricated pipe.

Other objects, together with the foregoing, are attained in the embodiment of the invention described in the accompanying description and illustrated in the accompanying drawings, in which:

FIGURE 2 is a cross section to an enlarged scale and on a horizontal plane as indicated by the line 2—2 of FIGURE 1.

FIGURE 3 is a transverse cross section to the scale of FIGURE 2, the plane of section being indicated by the line 3—3 of FIGURE 2.

FIGURE 7 is a cross section to a much enlarged scale, the plane of section being indicated by the line 7—7 of FIGURE 2.

FIGURE 8 is an isometric view to a greatly reduced scale, showing a fabricated pipe of the sort usually handled in connection with the structure and process of the invention.

While the device and process can be utilized in a number of different ways and in connection with various different pipes, it has successfully been employed in practice with a pipe 4 approximately five feet in diameter and fabricated substantially as shown in FIGURE 8. In this instance the pipe is comprised of a plurality of arcuate sections 6 secured together by longitudinal welding seams 7.

Figure 1:
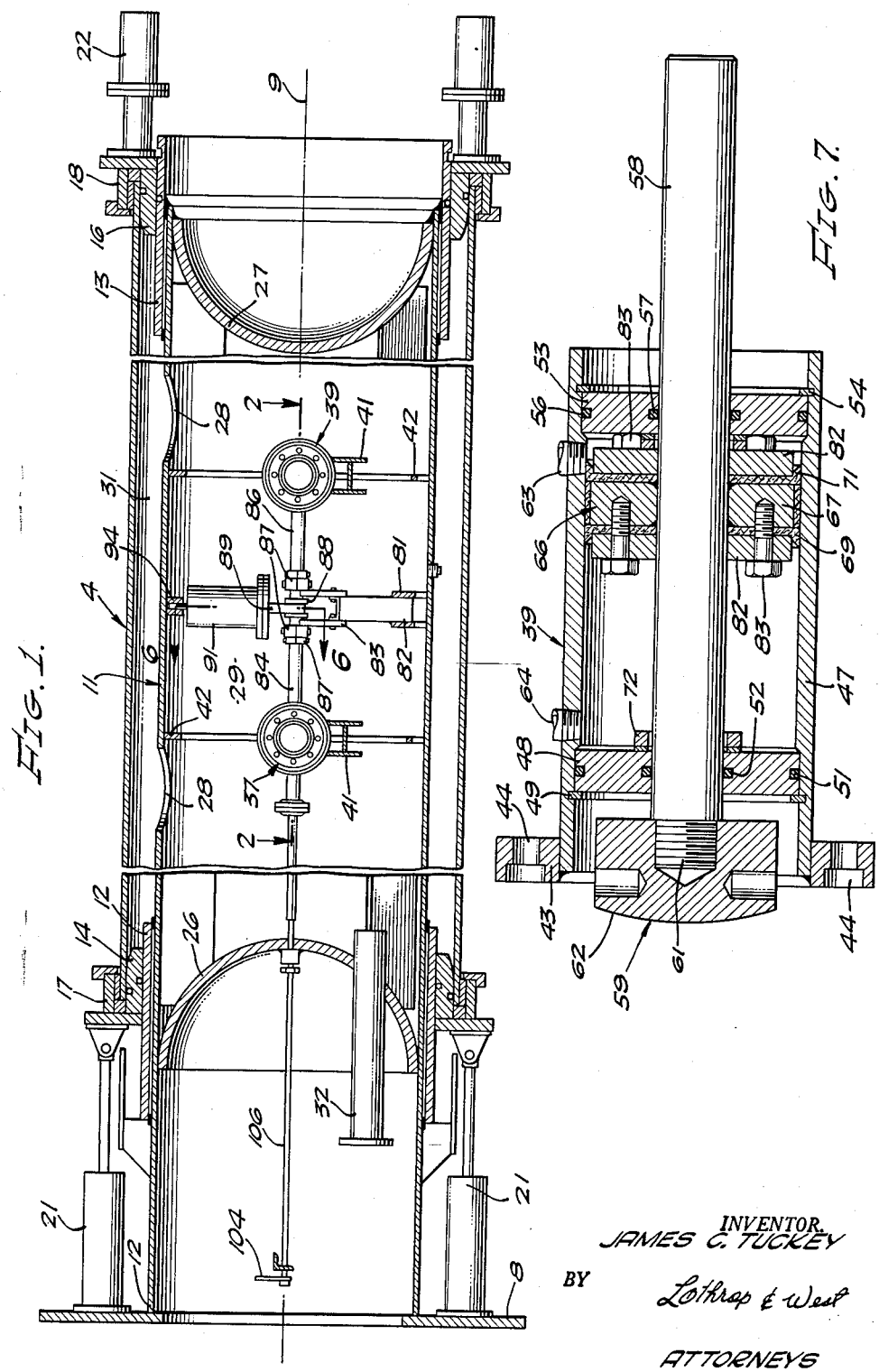
FIGURE 1 is a cross section on a longitudinal vertical plane through a machine constructed in accordance with the invention.

For use with such pipe there is provided a main frame 8 (FIGURE 1) suitably mounted and designed to receive the pipe 4 with the pipe as nearly as possible concentric with a central axis 9. When positioned on the machine the pipe 4 is disposed in circumscribing relationship to an interior frame 11 secured at one end 12 to the main frame 8 and projecting concentrically along the axis 9. The interior frame 11 is preferably tubular, and serves as the support for bands 12 and 13 carrying packing and guide rings 14 and 16 in substantially hydraulic tight engagement with the ends of the pipe 4. Surrounding the pipe are keeper rings 17 and 18. These are composite structures engageable in supporting relationship with the ends of the pipe 4 and appropriately manipulated in connection with the packing rings 14 and 16 by hydraulically actuated cylinders 21 and 22.

As disclosed in the mentioned Marinovich application, after the pipe 4 has been put in position and the cylinders 21 and 22 actuated to support and close the ends of the pipe, the interior of the pipe is subjected to hydraulic pressure. For that reason the interior frame 11 at its opposite end is closed by means of pressure heads 26 and 27 and the interior frame 11 has a number of openings 28 affording free communication between the chamber 29 within the frame and the remaining annular chamber 31 on the inside of the pipe 4.

Fluid such as water under substantial pressure from a fluid pressure source (not illustrated) but of a standard kind is made available through suitable valving (also not illustrated) to a conduit 32 extending through the head 26. Pressure fluid is thereby admitted to the interior of the structure displacing all of the contained air through the openings 28 and through a suitable discharge near the top of the pipe 4. Eventually the entire interior of the pipe 4 is filled with hydraulic fluid and the air outlet is closed. The pressure of the hydraulic fluid then is increased and causes circumferential expansion of the pipe 4 to any desired extent. This much of the operation of the present structure is substantially the same as that shown in the Marinovich application.

In the present instance it has been found that, while the described hydraulic pressure alone may be sufficient to render the pipe round or substantially so in cross section, it is not effective to straighten the pipe lengthwise nor to take out the longitudinal curvature of the pipe nor to make it coaxial substantially from end to end with the longitudinal axis 9. The amount of curvature in any given pipe varies somewhat depending upon its individual construction, depending also upon the nature of the individual plates 6 which go into its fabrication, and depending upon various other factors including position during welding and handling after welding. In most cases it is found that the pipe is bowed in a horizontal plane after being fabricated in a certain orientation, or can be rotated so that the bow is in a horizontal plane. It is preferred to describe the operation of the structure and the process in connection with straightening of a horizontal or transverse bow in the pipe.

Pursuant to the present invention, the interior frame 11 within the compartment 29, and preferably in the central portion of the structure, is provided with a plurality of jack mechanisms. Especially as illustrated in FIGURE 2, there are two jacks 36 and 37 in transverse alignment in a horizontal plane and located nearer the main frame 8 and another pair of jacks 38 and 39 located on a parallel transverse axis farther from the main frame 8. The jacks are appropriately supported on framing 41 secured to reinforcing rings 42 within the interior of the frame 11.

Since the jacks are all alike, the description of one applies to the others. Each of the jacks has a flange 43 with suitable apertures 44 for fastening devices designed to secure the flange 43 in position against a contoured collar 46 secured to the interior frame 11. The flange 43 is joined to a jack cylinder 47. A head 48 is secured in position within the cylinder 47 by a fastening ring 49 and carries a pair of packing rings 51 and 52 to preclude leakage. Similarly, the inboard end of the cylinder 47 is provided with a second head 53 held in place by a fastening ring 54 and having packing rings 56 and 57. Operably disposed within the cylinder and running in the heads 48 and 53 is a ramrod 58 of sufficient length to extend substantially beyond the end of the cylinder 47 on the inboard end and at its outboard end carrying a ram 59 secured to the rod by a threaded interengagement 61. Preferably the ram 59 has a somewhat spherical or outwardly rounded operating face 62. The cylinder 47 is provided with a first hydraulic connection 63 extending through suitable valving to the source of hydraulic pressure or to waste and is also provided with a second connection 64 similarly arranged.

On the ramrod 58 there is fixed a piston 66 which is a composite structure including a central plate 67 welded to the ramrod 58 and having appropriate packings 69 and 71 held in position by removable discs 82 and fastenings 83.

When the connection 64 is open to waste or exhaust and hydraulic pressure fluid is admitted through the connection 63, the pressure against the piston 66 translates the ramrod 58 to the left in FIGURE 7 and drives the ram 59 outwardly. Reverse hydraulic connections result in reverse ram movement. Pursuant to the invention, all of the jacks 36, 37, 38 and 39 are connected into the hydraulic circuit for simultaneous operation in corresponding directions. That is, all of the rams move radially outwardly simultaneously or all of the rams are moved radially inwardly simultaneously.

When an empty pipe 4 is in position and before it is subjected to internal hydraulic pressure, the various jacks 36, 37, 38 and 39 are connected to the pressure source through the connection 63 and all of the respective rams 59 are moved radially outwardly substantially in the transverse or horizontal plane containing the axis 9. The rounded ends of the rams 59 sooner or later engage the inner surface of the wall of the pipe 4. As shown by the broken lines 71 in FIGURE 2, the walls of the pipe prior to expansion particularly in the horizontal plane are usually initially out of position, being too close to the axis 9 on one or both sides. This is not necessarily a regular malpositioning, so that the rams 59 may actually contact the distorted walls and move them outwardly at different points in the stroke.

As the hydraulic pressure on the rams continues, they all move outwardly to the maximum stroke of the individual jacks. This stroke is limited in each case by a stop ring 72 (FIG. 7) within the jack itself. Thus the four rams are initially moved out to predetermined locations in precisely the particular zones for each location at which the finished pipe wall must be disposed for accurate configuration. Thus the individual ram zones are initially bumped or curved outwardly substantially as shown by the adjacent broken lines in FIGURE 2.

While the rams may be held outwardly by a superior hydraulic pressure during the remainder of the operation, it is preferred to have a positive mechanical lock to prevent any retrogression of the extended rams. For this reason, the interior frame 11 at an appropriate point carries a bridge 81 and a strut 82 as well as cross members 83 for supporting shafts 84 and 86 substantially coincident with the axis 9 and mounted in appropriate bearings 87. Between the bearings the shafts 84 and 86 are joined to a crank 88. A piston rod 89 projecting from a hydraulic cylinder 91 is connected to the crank 88 by a pin 92 while the cylinder 91 itself is mounted for oscillating motion by a pin 93 engaging a beam 94 spanning the interior of the frame 11.

The cylinder 91 is preferably supplied with hydraulic fluid on opposite sides of a piston 96 on the piston rod 89. Suitable connections, not shown, extend to the source of hydraulic pressure fluid and to waste.

Figure 4:
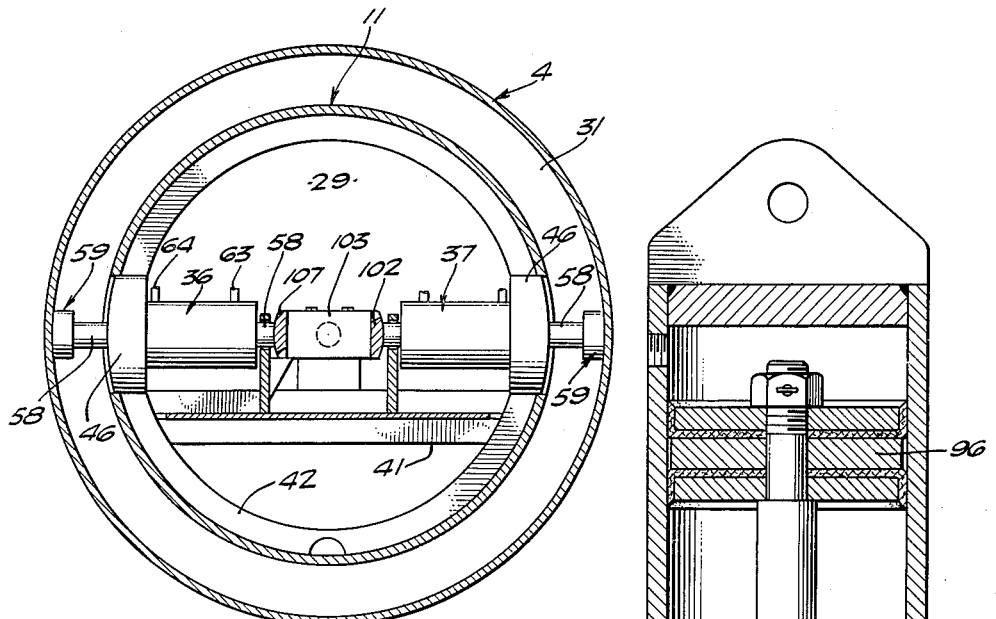
FIGURE 4 is a cross section to the scale of FIGURE 2, the plane of section being on the line 4—4 of FIGURE 2.
Figure 6:
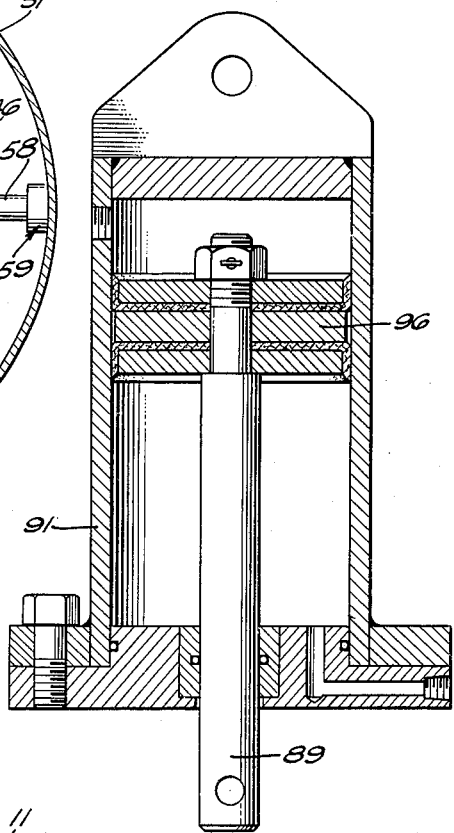
FIGURE 6 is a cross section to a much enlarged scale, the plane of section being indicated by the line 6—6 of FIGURE 1.

Mounted on the shafts 84 and 86 and between the respective pairs of ram jacks, are pairs of cams such as 101 and 102, shown in FIGURE 4. The cam members are at diametrically opposite sides of yokes 103 secured to the shafts 84 and 86 and designed to be rotated in conjunction therewith when the cylinder 91 is appropriately actuated. Preferably the contour of the cams 101 and 102 is such that when the rams 59 are in proper final position with the interior surface of the surrounding pipe 4, the rotation of the shafts 84 and 86 very easily moves the cams 101 and 102 into snug or wedged relationship with the still exposed interior ends of the ramrods 58.

After the cams 101 and 102 have been suitably engaged with the rods 58, the presence or absence of pressure fluid within the jacks tending to drive the rams outwardly, or around the rams tending to drive them inwardly, is immaterial. Furthermore, the cams assist in the final precise location of the rams themselves so that a uniform actuation is had in each successive instance. The rotary operation of the cylinder 91 is indicated to the operator by means of a pointer 104 and appropriate connecting mechanism 106.

In the operation of the mechanism, after the individual rams have been operated to produce a plurality of local zone enlargements in the pipe wall to the desired final position, and after the cylinder 91 has been energized to move the restraining cams 101 and 102 into locking position, then the interior of the pipe 4 is filled with hydraulic fluid under pressure, as previously described. The resulting pressure is such as to expand the pipe 4 out to a diameter substantially the same as that of the diameter of the just formed locally enlarged zones at the positioning of the rams 59. The tendency of the entire pipe is to expand and to straighten so that the pipe ultimately turns out to be a substantially accurate circular cylinder symmetrical with the axis 9 and having an inner diameter uniformly as established by the initial positioning of the rams 59.

Figure 5:
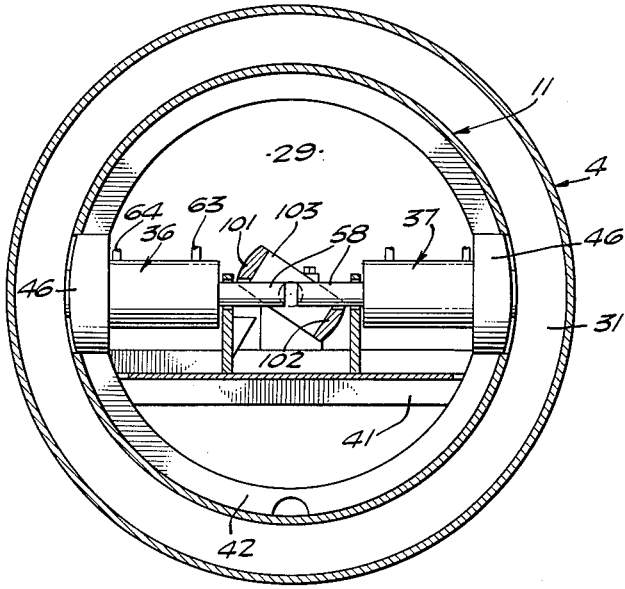
FIGURE 5 is a cross section similar to FIGURE 4 but showing the parts in a different location.

After the pipe has attained this shape and condition and has been so expanded and straightened, hydraulic liquid is released from within the pipe 4 by a reversal of the controls and the pipe is drained. Subsequently the cylinder 91 has its own controls reversed so that the cams 101 and 102 are rotated out of their active position, as seen in FIGURE 4, into an inactive position, as seen in FIGURE 5. As soon as this has been accomplished, the controls to the four rams 36, 37, 38 and 39 are also reversed so that pressure on the inboard ends of the rams is released to drain and pressure fluid is imposed on the outboard sides of the pistons 66. This retracts all four of the rams substantially simultaneously into their innermost position, as shown in FIGURE 7. Following this, the jacks 21 and 22 are reversed so that the ends of the pipe are released and no longer supported and the pipe is removed from the structure which is then available for re-cycling with a subsequent pipe.

What is claimed is:

1. A pipe expander comprising a main frame, means on said main frame for closing and supporting the ends of a pipe to be expanded, an interior frame connected to said main frame and disposed within said pipe, a hydraulic jack including a cylinder on said interior frame, a ram reciprocable within said cylinder and having portions projecting from both ends of said cylinder, means for hydraulically actuating said jack to engage one of said portions of said ram with said pipe, and means on said interior frame and movable into abutment with the other of said portions for mechanically holding said one portion of said ram in engagement with said pipe.

2. A pipe expander comprising a main frame, means on said main frame for engaging and supporting a pipe thereon for hydraulic expansion, means on said main frame for supporting a hydraulic jack within said pipe, said jack including a cylinder and a ram having portions projecting from both ends of said cylinder, means for hydraulically actuating said jack to engage one of said portions of said ram with the interior of said pipe, and means engaging the other of said portions of said ram for mechanically holding said one of said portions of said ram in engagement with said pipe.

3. A pipe expander comprising means for holding a pipe and subjecting the held pipe to interior hydraulic pressure, a jack including a cylinder and a ram entirely disposed within said pipe, means for moving said ram relative to said cylinder between a retracted position and a projected position in engagement with the interior of said pipe, and means independent of said ram moving means and movable into space occupied by said ram when in said retracted position for engaging said ram when in said projected position to hold said ram in engagement with the interior of said pipe.

4. A pipe expander comprising means for holding a pipe, means for subjecting the interior of said held pipe to hydraulic pressure, a ram disposed in a radial position within said pipe, said ram having a radially outer end and a radially inner end, means for hydraulically moving said radially outer end of said ram into engagement with said pipe, and means independent of said hydraulic means and movable into abutment with said radially inner end of said ram for holding said ram in said engagement with said pipe.

5. A pipe expander comprising means for holding a pipe, means including a source of hydraulic pressure for subjecting the interior of said pipe to said hydraulic pressure, a ram disposed within said pipe and radially movable with respect thereto, means for hydraulically moving said ram into a radially outward position to engage the interior of said pipe, means for connecting said moving means to said source of hydraulic pressure, and means independent of said source of hydraulic pressure and movable into abutment with said ram when said ram is in said position for holding said ram in engagement with said interior of said pipe.

6. A pipe expander comprising a main frame, means on said main frame for closing and supporting the ends of a pipe to be expanded, an interior frame projecting from said main frame into said pipe, a ram movable radially of said interior frame into a radially outward position, means on said interior frame for projecting said ram into said position to engage the interior of said pipe, a source of hydraulic pressure, means using pressure from said source for actuating said projecting means, means for subjecting said pipe to pressure from said source, and means independent of pressure from said source and movable into abutment with said ram when said ram is in said position for holding said ram in said position engaging the interior of said pipe.

7. A pipe expander comprising a main frame, means on said main frame for closing and supporting the ends of a pipe to be expanded, an interior frame projecting from said main frame into said pipe, a radial ram having an inner end and an outer end means on said interior frame for projecting said ram to engage said outer end with the interior of said pipe, means for subjecting said ram and the interior of said pipe to hydraulic pressure, and means on said interior frame and movable into abutment with said inner end for supporting said ram against said pressure.

References Cited in the file of this patent

UNITED STATES PATENTS

| | | |
|---|---|---|
| 2,280,255 | Parker et al. | Apr. 21, 1942 |
| 2,396,380 | Longley | Mar. 12, 1946 |
| 2,525,680 | Ingemarson | Oct. 10, 1950 |
| 2,667,136 | Reichl et al. | Jan. 26, 1954 |
| 2,773,538 | De Mers | Dec. 11, 1956 |
| 2,941,568 | Ottestad et al. | June 21, 1960 |